US009380417B1

United States Patent
Boyle et al.

(10) Patent No.: US 9,380,417 B1
(45) Date of Patent: *Jun. 28, 2016

(54) METHOD AND SYSTEM FOR WAYFINDING AT A VENUE

(71) Applicant: Joingo, LLC, San Jose, CA (US)

(72) Inventors: Stephen S. Boyle, Lincoln, CA (US); Russell S. Greer, Los Gatos, CA (US); Thang Dao, San Jose, CA (US); Evan Bigall, Mountain View, CA (US)

(73) Assignee: Joingo, LLC, San Jose, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/287,161

(22) Filed: May 26, 2014

(51) Int. Cl.
*H04W 4/02* (2009.01)
*H04W 4/04* (2009.01)
*H04W 4/00* (2009.01)
*H04W 64/00* (2009.01)

(52) U.S. Cl.
CPC .............. *H04W 4/02* (2013.01); *H04W 4/008* (2013.01); *H04W 4/043* (2013.01); *H04W 64/00* (2013.01)

(58) Field of Classification Search
CPC ....... H04W 4/02; H04W 4/043; H04W 4/008; H04W 64/00
USPC .............. 455/41.1–41.2, 404.2, 414.1–414.2, 455/421, 456.1–457; 340/539.13
See application file for complete search history.

(56) References Cited

U.S. PATENT DOCUMENTS

| 8,498,811 | B2 | 7/2013 | Lundquist et al. | |
|---|---|---|---|---|
| 2007/0001904 | A1 | 1/2007 | Mendelson | |
| 2008/0134030 | A1* | 6/2008 | Kansal | G06F 3/0481 715/700 |
| 2008/0275630 | A1* | 11/2008 | Regienczuk | G06Q 30/02 701/532 |
| 2010/0268462 | A1 | 10/2010 | Tebbit et al. | |
| 2012/0015665 | A1* | 1/2012 | Farley | G01S 5/0036 455/456.1 |
| 2012/0143495 | A1 | 6/2012 | Dantu | |
| 2012/0264447 | A1* | 10/2012 | Rieger, III | G01S 5/0252 455/456.1 |
| 2013/0045751 | A1* | 2/2013 | Chao | G01C 21/206 455/456.1 |
| 2014/0019230 | A1* | 1/2014 | Lawson | G06Q 30/02 705/14.45 |
| 2014/0379296 | A1* | 12/2014 | Nathan | G06Q 10/08 702/150 |

* cited by examiner

*Primary Examiner* — Michael Mapa
(74) *Attorney, Agent, or Firm* — Clause Eight IPS; Michael Catania

(57) ABSTRACT

A system and method for wayfinding at a venue is disclosed herein. The system includes a mobile communication device and a venue. The mobile communication device includes an application for wayfinding at the venue and a plurality of sensors. The mobile communication device is configured to track a path of the mobile communication device from the first fixed geographical location utilizing a plurality of sensors of the mobile communication device.

15 Claims, 9 Drawing Sheets

METHOD AND SYSTEM FOR WAYFINDING AT A VENUE

CROSS REFERENCES TO RELATED APPLICATIONS

The present application is a continuation application of U.S. patent application Ser. No. 14/016,185 filed on Sep. 2, 2013, which claims priority to U.S. Provisional Patent Application No. 61/828,657, filed on May 29, 2013, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to wayfinding at a venue. More specifically, the present invention relates to a method and system for wayfinding a mobile communication device at a venue.

2. Description of the Related Art

The prior art discusses various methods for indoor positioning.

One reference is Lundquist et al., U.S. Pat. No. 8,498,811 for a Method And Device For Indoor Positioning, which discloses a user carried device with a direction sensor.

Another example is Mendelson, U.S. Patent Publication Number 20070001904 for a System And Method Navigating Indoors And Outdoors Without GPS Utilizing Network Sensors, which discloses the use of RF sensors.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

Freemium is offering a first service free and then if warranted offering a second service for a fee.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a predetermined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

WiFi is wireless networking using the 802.11 communication standard from the IEEE (802.11ac is the latest version) and transmitting at 2.4 GHz or 5 GHz.

Wireless Application Protocol is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

Wireless Application Protocol Push is defined as an encoded Wireless Application Protocol content message delivered (pushed) to a mobile communication device which includes a link to a Wireless Application Protocol address.

There is a need for maneuvering within a venue.

BRIEF SUMMARY OF THE INVENTION

One aspect of the present invention is a method for wayfinding at a venue.

Another aspect of the present invention is a system for communicating between a mobile communication device and a venue server to determine a device location at a venue utilizing data from the mobile communication device. The system includes a mobile communication device and a venue. The mobile communication device comprises an application, a plurality of sensors, a battery, and a plurality of possible paths. The venue comprises a venue network with a venue server, a HTTP proxy and plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device in conjunction with the plurality of possible paths. The mobile communication device is configured to utilize a venue network to determine a second fixed geographical location of the mobile communication device at the venue. The mobile communication device is configured to calculate an error factor for the tracking the path of the mobile communication device from the first fixed geographical location for the mobile communication device to the second fixed geographical location for the mobile communication device. Subsequent approximations of the handset location from the latest fixed geographical location are made using the plurality of sensors, plurality of possible paths, and the error factor which improves accuracy of approximation over time.

The tracked path can be overlayed on a map of the venue on the mobile communication device or graphical user interface for a server of the venue. A remote server is preferably in communication with the venue network over a communications network.

The venue is preferably one of an airport, a retail mall, a casino resort, a hospital, a hotel, a convention center, a university, a school, an amusement park, and a municipality.

Yet another aspect of the present invention is an over-the-top ("OTT") WiFi system for a venue.

Yet another aspect of the present invention is indoor mapping and guidance without the use of a GPS system.

The venue is preferably one of an airport, a retail mall, a casino resort, a hospital, a hotel, a convention center, a university, a school, an amusement park, and a municipality. However those skilled in the pertinent art will recognize that the venue may be another area, building or the like without departing from the scope and spirit of the present invention.

Another aspect of the present invention is a method for wayfinding at a venue. The method includes launching a mobile application on a mobile communication device within a venue. The mobile application is for wayfinding at the venue. The method also includes receiving a beacon signal from a first BLUETOOTH low energy beacon at the mobile application. The method also includes transmitting a first message from the mobile application to a wayfinding server. The first message comprises an identifier for the first BLUETOOTH low energy beacon and an identifier for the mobile application. The method also includes determining a first fixed geographical location for the mobile communication device at the wayfinding server based on the first message. The method also includes transmitting the first fixed geographical location from the wayfinding server to the mobile application. The method also includes tracking a path of the mobile communication device from the first fixed geographical location utilizing a plurality of sensors of the mobile communication device. The method also includes receiving a beacon signal from a second BLUETOOTH low energy beacon at the mobile application. The method also includes transmitting a second message from the mobile application to the wayfinding server. The second message comprises an identifier for the second BLUETOOTH low energy beacon and the identifier for the mobile application. The method also includes determining a second fixed geographical location for the mobile communication device at the wayfinding server based on the second message. The method also includes transmitting the second fixed geographical location from the wayfinding server to the mobile application.

The method also further includes transmitting venue content to the mobile communication device based on the path of the mobile communication from the first fixed geographical location to the second fixed geographical location. The venue is a casino resort and the venue content is an offer from a bank of slot machines along the path of the mobile communication device, the venue is a retail shopping mall and the venue content is an offer from a retail store along the path of the mobile communication device, or the venue is a retail mall and the venue content is an electronic gift card for purchases at the retail mall.

The method also further includes illustrating the path of the mobile communication device on a display of the mobile communication device.

Yet another aspect of the present invention is a system for wayfinding at a venue. The system includes a mobile communication device, a wayfinding server and a venue. The mobile communication device includes an application for wayfinding at the venue and a plurality of sensors. The venue includes a plurality of BLUETOOTH low energy beacons positioned within the venue with a first BLUETOOTH low energy beacon positioned at an entrance to the venue. The mobile native application is configured to receive a beacon signal from the first BLUETOOTH low energy beacon and transmit a first message to the wayfinding server. The first message comprising an identifier for the first BLUETOOTH low energy beacon and an identifier for the mobile application. The wayfinding server is configured to receive the first message, determine a first fixed geographical location for the mobile device, and transmit the first fixed geographical location to the mobile native application. The mobile communication device is configured to track a path of the mobile communication device from the first fixed geographical location utilizing a plurality of sensors of the mobile communication device. The mobile native application is configured to receive a beacon signal from a second BLUETOOTH low energy beacon of the plurality of BLUETOOTH low energy beacons, and transmit a second message to the wayfinding. The second message comprises an identifier for the second BLUETOOTH low energy beacon and the identifier for the mobile application. The wayfinding server is configured to receive the second message, determine a second fixed geographical location for the mobile device, and transmit the second fixed geographical location to the mobile native application.

The plurality of sensors of the mobile communication device comprises an accelerometer, a magnetometer and a gyroscope.

Yet another aspect of the present invention is a method for wayfinding at a venue using an error factor. The method includes launching an application on a mobile communication device within a venue. The application is for wayfinding at the venue. The method also includes generating a first fixed geographical location of the mobile communication device at the venue utilizing a venue network. The method also includes tracking a path of the mobile communication device from the first fixed geographical location utilizing a plurality of sensors of the mobile communication device. The method also includes generating a second geographical location for the mobile communication device within a meter of the first fixed geographical location for the mobile communication device. The method also includes calculating an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a method for wayfinding at a venue by adjusting estimated geographical location. The method includes launching an application on a mobile communication device within a venue, the application for wayfinding at the venue. The method also includes generating a first fixed geographical location of the mobile communication device at the venue utilizing a venue network. The method also includes tracking a path of the mobile communication device from the first fixed geographical location utilizing a plurality of sensors of the mobile communication device to generate an estimated geographical location of the mobile communication device at the venue. The method also includes generating a second geographical location for the mobile communication device at the venue utilizing the venue network. The method also includes adjusting estimated geographical location of the mobile communication device based on the second geographical location for the mobile communication device. The method also includes calculating an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a method for wayfinding at a venue while conserving battery power of a mobile communication device. The method includes launching an application on a mobile communication device within a venue. The application for wayfinding at the venue, the mobile communication device comprising a battery. The method also includes generating a first fixed geographical location of the mobile communication device at the venue utilizing a venue network. The method also includes tracking a path of the mobile communication device from the first fixed geographical location utilizing a plurality of sensors of the mobile communication device. The method also includes generating a second geographical location for the mobile communication device at the venue utilizing the venue network. The method also includes moving a current location of the path of the mobile communication device to the second geographical location for the mobile communication device at the venue. The method also includes suspending request transmissions from the mobile communication device while an accelerometer sensor of the mobile communication device indicates a lack of movement.

Yet another aspect of the present invention is a system for wayfinding at a venue while conserving battery power of a mobile communication device. The system includes a mobile communication device and a venue. The mobile communication device comprises an application for wayfinding at the venue, a plurality of sensors and a battery. The venue comprising a venue network with a plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device. The mobile communication device is configured to utilize a venue network to determine a second fixed geographical location of the mobile communication device at the venue. The mobile communication device is configured to move a current location of the path of the mobile communication device to the second geographical location for the mobile communication device at the venue. The mobile communication device is configured to suspend request transmissions from the mobile communication device while an accelerometer sensor of the mobile communication device indicates a lack of movement.

Yet another aspect of the present invention is a system for wayfinding at a venue by calculating an error factor. The system includes a mobile communication device and a venue. The mobile communication device comprises an application for wayfinding at the venue, a plurality of sensors and a battery. The venue comprises a venue network with a plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device. The mobile communication device is configured to utilize a venue network to determine a second fixed geographical location of the mobile communication device at the venue within a meter of the first fixed geographical location for the mobile communication device. The mobile communication device is configured to calculate an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a system for wayfinding at a venue by adjusting a path. The system includes a mobile communication device and a venue. The mobile communication device comprises an application for wayfinding at the venue, a plurality of sensors and a battery. The venue comprises a venue network with a plurality of wireless access points. The mobile communication device is configured to utilize the venue network to determine a first fixed geographical location of the mobile communication device at the venue. The mobile communication device is configured to track a path of the mobile communication device from the first fixed geographical location utilizing a plurality of sensors of the mobile communication device to generate an estimated geographical location of the mobile communication device at the venue. The mobile communication device is configured to utilize a venue network to determine a second fixed geographical location of the mobile communication device at the venue within a meter of the first fixed geographical location for the mobile communication device. The mobile communication device is configured to adjust the estimated geographical location of the mobile communication device based on the second geographical location for the mobile communication device. The mobile communication device is configured to calculate an error factor for the tracking the path of the mobile communication device from the first fixed geographical location for the mobile communication device to the second fixed geographical location for the mobile communication device. The error factor is utilized for the tracking a subsequent path of the mobile communication device within the venue.

Yet another aspect of the present invention is a system for wayfinding at a venue by guiding the mobile communication device. The system includes a mobile communication device and a venue. The mobile communication device comprises an application for wayfinding at the venue, a plurality of sensors and a battery. The venue comprises a venue network with a plurality of wireless access points. The mobile communication device is configured to utilize the venue network to determine a first fixed geographical location of the mobile communication device at the venue. The mobile communication device is configured to receive an input on the application for a second fixed geographical location within the venue. The mobile communication device is configured to guide an end user of the mobile communication device from the first fixed geographical location to the second fixed geographical location in the venue utilizing a plurality of sensors of the mobile communication device.

Yet another aspect of the present invention is a method for wayfinding at a venue by guiding the mobile communication device. The method includes launching a mobile application on a mobile communication device within a venue. The mobile application is for wayfinding at the venue. The method also includes utilizing a venue network to determine a first fixed geographical location of the mobile communication device at the venue. The method also includes inputting on the application a second fixed geographical location within the venue. The method also includes guiding an end user of the mobile communication device from the first fixed geographical location to the second fixed geographical location in the venue utilizing a plurality of sensors of the mobile communication device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
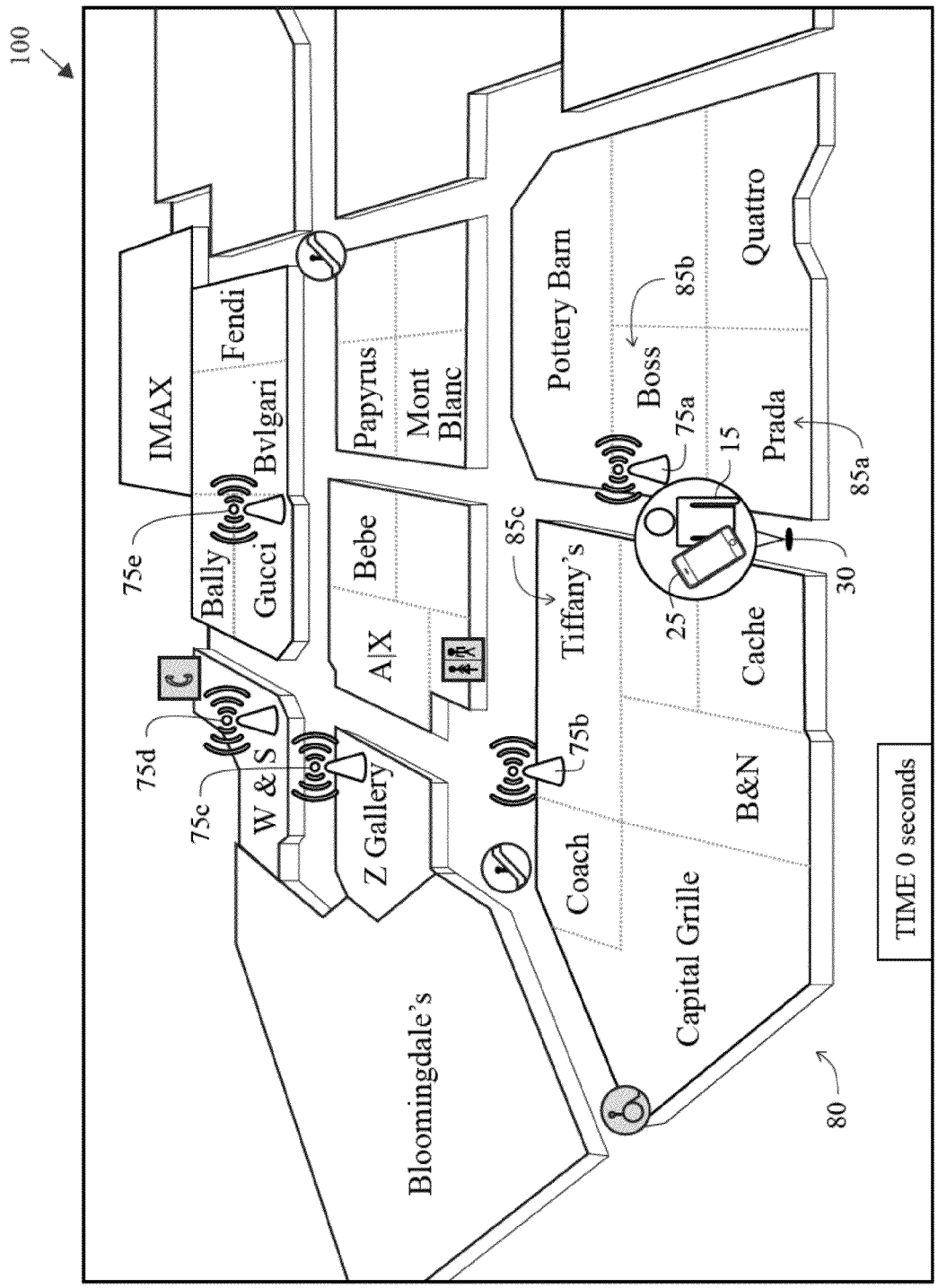
FIG. 1 is an illustration of a map of a retail mall illustrating a first fixed geographical location for a mobile communication device determined utilizing a venue network.
Figure 2:
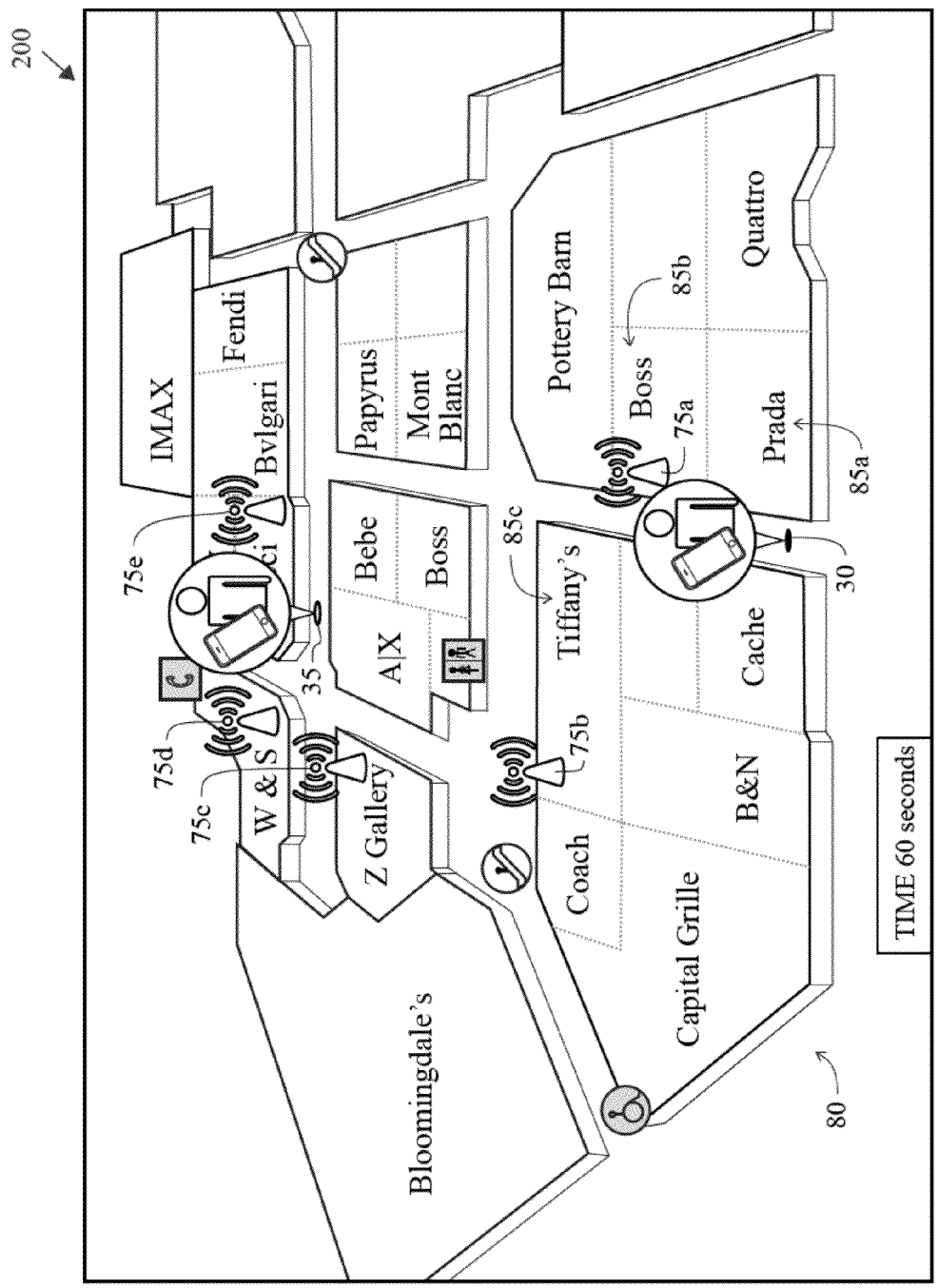
FIG. 2 is an illustration of a map of a retail mall illustrating a first fixed geographical location for a mobile communication device and a second fixed geographical location for a mobile communication device, both determined utilizing a venue network in accordance with the prior art.
Figure 2A:
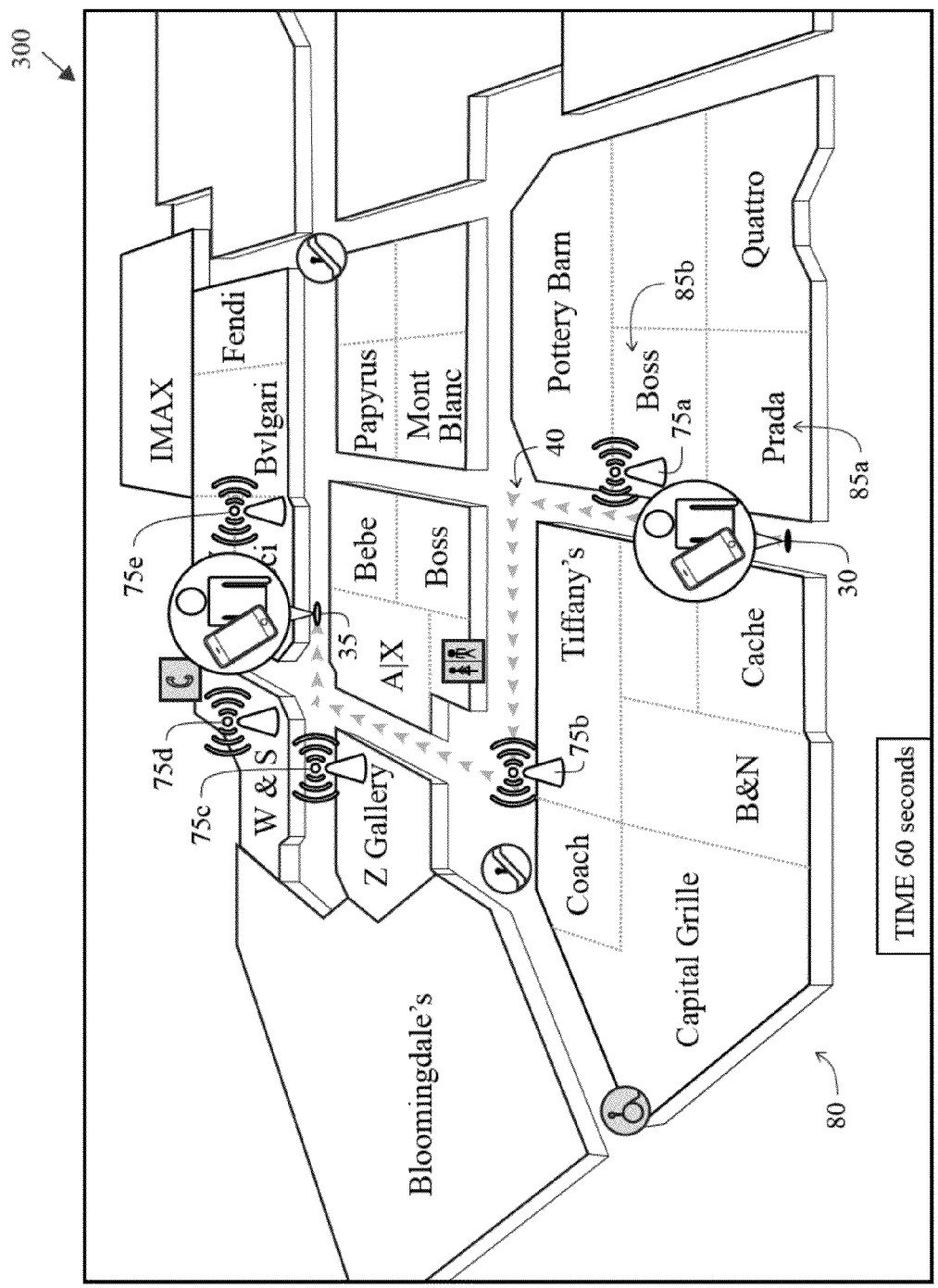
FIG. 2A is an illustration of a map of a retail mall illustrating a first fixed geographical location for a mobile communication device and a second fixed geographical location for a mobile communication device, both determined utilizing a venue network, and a tracking path determined by a plurality of sensors of the mobile communication device.

As shown in FIGS. 1 and 2A, the system 100 of the present invention provides guidance through a venue 80. In FIGS. 1 and 2A, the venue 80 is a retail mall with stores 85a, 85b and 85c. In alternative examples, the venue is preferably one of an airport, a casino resort, a hospital, a hotel, a convention center, a university, a school, an amusement park, and a municipality. However those skilled in the pertinent art will recognize that the venue may be another area, building or the like without departing from the scope and spirit of the present invention. The venue 80 preferably has a plurality of wireless access points ("WAPs") 75a, 75b, 75c, 75d, and 75e located throughout the mall 80. The WAPs are part of a venue network, which preferably includes a venue server with a HTTP proxy. The venue network is preferably a wireless local area network (WLAN) operating using an 802.11a, 802.11b, 802.11g or 802.11n wireless protocol as set forth by the IEEE.

FIG. 2 illustrates a system 200 of the prior art wherein only wireless access points ("WAPs") 75a, 75b, 75c, 75d, and 75e located throughout the mall 80 are used for location based tracking of an individual. Thus, the path of an end-user beginning at a first fixed geographical location 30 and ending at a second fixed geographical location 35 is unknown to a venue operator, and further the end user is unable to use a mobile communication device to use a path to guide the end user from the first fixed geographical location 30 to the second fixed geographical location 35. In the prior art shown in FIG. 2, the second fixed geographical location 35 in the venue 80 is determined at time sixty seconds. However, there is no tracking, mapping or wayfinding of what path the end user took from the first fixed geographical location 30 to the second fixed geographical location 35 since in the prior art the location is only determined through a WLAN of a venue at that calculation is performed at set intervals, such as every sixty seconds Referring back to FIGS. 1 and 2A, an end user 15 has a mobile communication device 25 with a resident native application for wayfinding. The end user enters the mall 80 and either manually activates the resident native application on the mobile communication device 25, or alternatively the resident native application is activated automatically. At time zero, a first fixed geographical location 30 is determined for the mobile communication device 25 through communication with the venue network.

In one embodiment, the end user 15 walks through the mall 80. In another embodiment, a venue offer is sent to the mobile device 25 and the end user proceeds to the location of the venue offer.

However, unlike the prior the art, the present invention utilizes a plurality of sensors on the mobile device 25 to provide wayfinding, tracking or mapping as the end user moves through the venue. In a preferred embodiment, an accelerometer 301 of the mobile device 25 is configured to determine a movement of the mobile communication device 25 and an orientation of the movement, a magnetometer 319 is configured to determine a true north heading of the mobile communication device 25, and a gyroscope 320 is configured to determine an orientation of the mobile communication device 25. In this manner, the present invention is able to provide a path 40 from the first fixed geographical location 30 to the second fixed geographical location 35 as shown in FIG. 2A. In one embodiment, this path 40 is tracking the mobile device 25 through the venue. In another embodiment, the path 40 provides directions from the first fixed geographical location 30 to the second fixed geographical location 35.

The guidance to the end user 15 from the mobile device 25 is provided as a display, a map, audio, tactile signals, text and/or the like.

The mobile device 25 is also preferably configured to calculate an error factor for the guidance provided from the plurality of sensors in order to provide a more defined path 40. The mobile device is also preferably configured to provide battery savings by deactivating the guidance processing while the accelerometer indicates that the mobile device 25 is not moving.

Figure 2B:
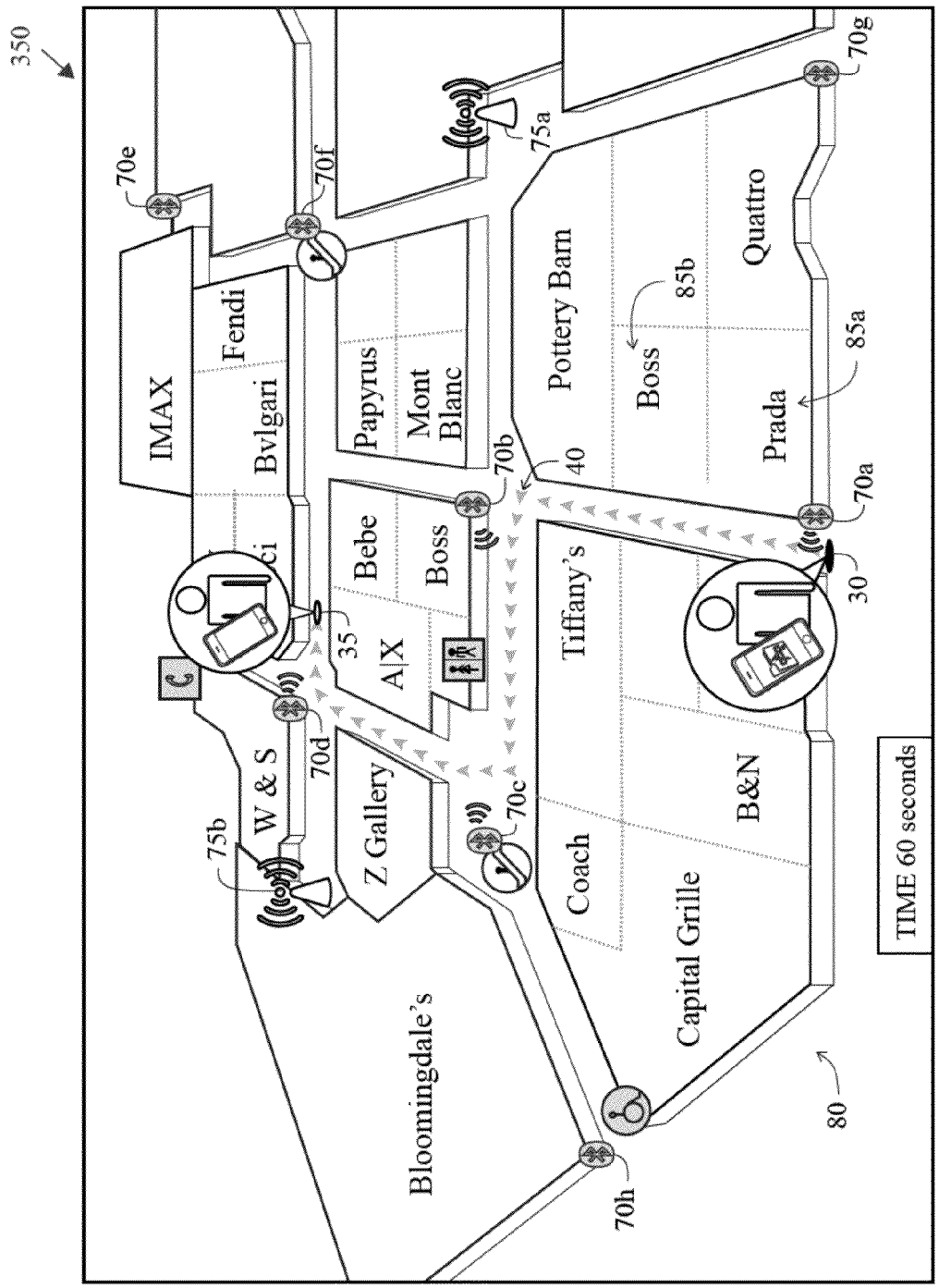
FIG. 2B is an illustration of a map of a retail mall illustrating a first fixed geographical location for a mobile communication device and a second fixed geographical location for a mobile communication device, both determined utilizing multiple BLUETOOTH low energy beacons of a venue network, and a tracking path determined by a plurality of sensors of the mobile communication device

A most preferred embodiment of the present invention is shown in FIG. 2B. The system 350 for wayfinding provides guidance through a venue 80. In FIG. 2B, the venue 80 is a retail mall with stores 85a, 85b and 85c. In alternative examples, the venue is preferably one of an airport, a casino resort, a hospital, a hotel, a convention center, a university, a school, an amusement park, and a municipality. However those skilled in the pertinent art will recognize that the venue may be another area, building or the like without departing from the scope and spirit of the present invention. The venue 80 preferably has a plurality of wireless access points ("WAPs") 75a, 75b, 75c, 75d, and 75e located throughout the mall 80. The WAPs are part of a venue network, which preferably includes a venue server with a HTTP proxy. The venue network is preferably a wireless local area network (WLAN) operating using an 802.11a, 802.11b, 802.11g or 802.11n wireless protocol as set forth by the IEEE. Additionally, the venue 80 comprises multiple BLUETOOTH low energy beacons 70a-70h positioned at "chokepoints" of the venue 80.

Figure 4:
FIG. 4 is an illustration of an entrance to a venue having multiple BLUETOOTH low energy beacons of a venue network for wayfinding within the venue.

For example, as shown in FIG. 4, BLUETOOTH low energy beacons 70a and 70b are positioned at an entrance to the venue 81. The BLUETOOTH low energy beacons 70a-70h are utilized to determine fixed geographical locations that are utilized for wayfinding at the venue 81. Upon entering the venue 81, the resident native application of the mobile communication device 25 of the end user 15 receives a beacon signal from the BLUETOOTH low energy beacon 70a. The beacon signal preferably comprises an identifier for the BLUETOOTH low energy beacon 70a. The resident native application transmits a message to a wayfinding server over a network. The network is preferably a cellular network, however, alternatively the network is the WLAN of the venue 81. The message preferably comprises the identifier for the BLUETOOTH low energy beacon 70a and an identifier for the mobile communication device 25 such as a loyalty number for a reward program of the venue 81, the MAC address of the mobile communication device 25, or some other identifier. The wayfinding server is configured to receive the first message, determine a first fixed geographical location 30 for the mobile communication device 25, and transmit the first fixed geographical location 30 to the resident native application for use in tracking or guidance through the venue 81.

As shown in FIG. 2B, a path 40 from the first fixed geographical location 30 is displayed on a map of the venue 80. A plurality of sensors on the mobile device 25 provides wayfinding, tracking or mapping as the end user moves through the venue 80. In a preferred embodiment, an accelerometer 301 of the mobile device 25 is configured to determine a movement of the mobile communication device 25 and an orientation of the movement, a magnetometer 319 is configured to determine a true north heading of the mobile communication device 25, and a gyroscope 320 is configured to determine an orientation of the mobile communication device 25. In this manner, the present invention is able to provide a path 40 from the first fixed geographical location 30 to the second fixed geographical location 35 as shown in FIG. 2B. In one embodiment, this path 40 is tracking the mobile device 25 through the venue. In another embodiment, the path 40 provides directions from the first fixed geographical location 30 to the second fixed geographical location 35. At the second fixed geographical location 35, the resident native application of the mobile communication device 25 of the end user 15 receives a beacon signal from the BLUETOOTH low energy beacon 70d. The beacon signal preferably comprises an identifier for the BLUETOOTH low energy beacon 70d. The resident native application transmits a message to a wayfinding server over a network. The network is preferably a cellular network, however, alternatively the network is the WLAN of the venue 80. The message preferably comprises the identifier for the BLUETOOTH low energy beacon 70d and an identifier for the mobile communication device 25. The wayfinding server is configured to receive the second message, determine a second fixed geographical location 35 for the mobile communication device 25, and transmit the second fixed geographical location 35 to the resident native application to confirm the tracking/wayfinding provided by the sensors of the mobile communication device 25. If a map is used by the resident native application, the second fixed geographical location 35 is identified on the map and the path 40 is modified if necessary to reflect the true path 40 from the first fixed geographical location 30 to the second fixed geographical location 35.

The mobile communication devices 25 utilized with the present invention preferably include mobile phones, smartphones, tablet computers, PDAs and the like. Examples of smartphones include the IPHONE® smartphone from Apple, Inc., the GALAXY® from Samsung, the DROID® smartphone from Motorola Mobility Inc., and many more. Examples of tablet computing devices include the IPAD® tablet from Apple Inc., and the XOOM™ tablet from Motorola Mobility Inc.

Figure 3:
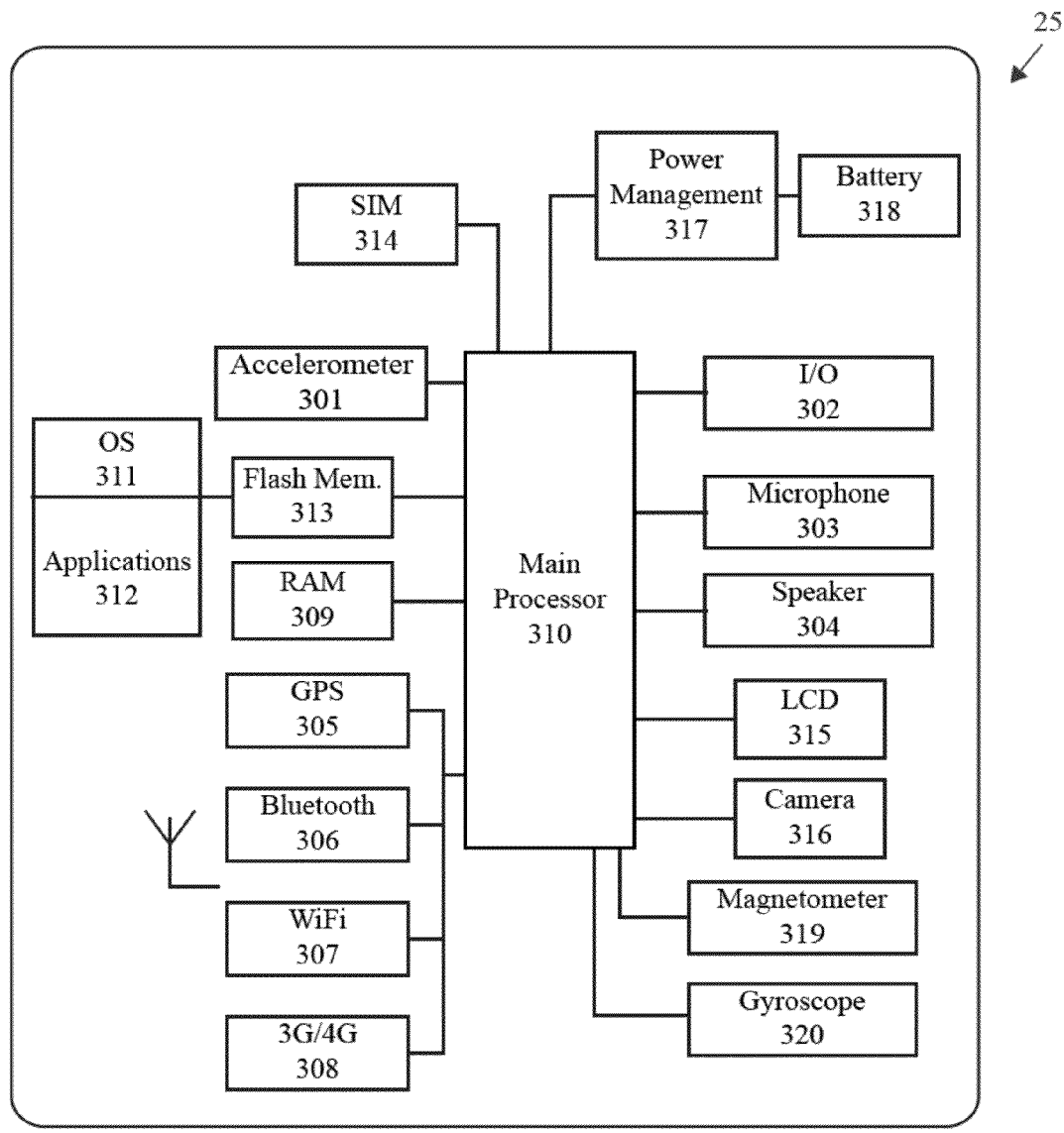
FIG. 3 is a block diagram of components of a mobile communication device.

As shown in FIG. 3, typical components of a mobile communication device 25 include an accelerometer 301, an input/output interface 302, a microphone 303, a speaker 304, a GPS chipset 305, a Bluetooth component 306, a WiFi component 307, a 3G/4G component 308, a RAM 309, a main processor 310, an operating system 311, applications 312, a flash memory 313, SIM card 314, LCD display 315, a camera 316, a power management circuit 317, a battery or power source 318, a magnetometer 319 and a gyroscope 320.

Positioning algorithms are preferably utilized in tracking the movement of the mobile device 25 through the venue 5. Seifert et al., Implementing Positioning Algorithms Using Accelerometers, Freescale Semiconductor Application Note, Rev. 0, 02/2007, AN3397, which is hereby incorporated by reference in its entirety, discloses several algorithms that may be utilized with the present invention. The accelerometer 301 preferably transmits X-axis, Y-axis and Z-axis signals for the motion of the mobile communication device 25 to an accelerometer data evaluation component of the main processor 310. One such accelerometer 301 is a multiple-axis accelerometer, such as the ADXL202 made by Analog Devices of Norwood, Mass., which is a standard micro-electronic-machine ("MEMs ") module that measures acceleration and deceleration using an array of silicon-based structures. Another accelerometer 301 is the STMicro STM33DH accelerometer from STMicroelectronics. A magnetometer 319 is a magnetoresistive permalloy sensor that measures the strength and direction of a magnetic field, and is utilized as a compass in a mobile communication device 25. One preferred magnetometer is the AN-203 from Honeywell, which measures magnetic fields within a +/−2 gauss range, and is sensitive to magnetic fields of less than 100 microgauss. The magnetometer is preferably utilized to provide a heading to the geomagnetic North Pole (not the North Pole) which has a magnetic field of roughly 0.6 gauss. A gyroscope 320 is another sensor of the plurality of sensors for wayfinding for the mobile communication device 25. A gyroscope 320 measures orientation based on angular momentum. A preferred gyroscope 320 is the MEMS gyroscope from STMicroelectronics such as the STMicro L3G4200D gyroscope. With these three sensors, the accelerometer 301, the magnetometer 319 and the gyroscope 320, the mobile communication device 25 is able to utilize the information from the WLAN of the venue 5 to wayfind through the venue 5, and provide directions to the user of the mobile communication device 25.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

Figure 5:
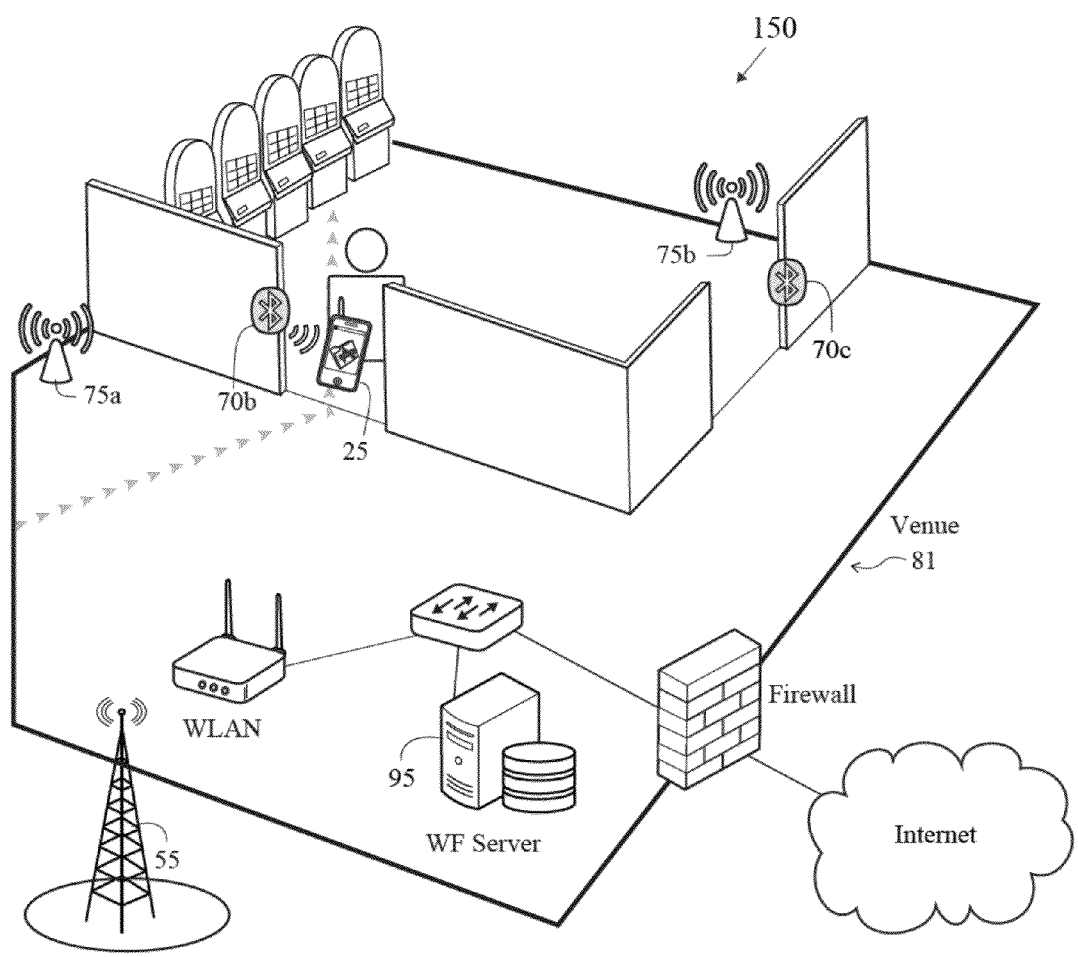
FIG. 5 is a block diagram of the implementation components of the system for wayfinding.

FIG. 5 is a block diagram of a system 150 for wayfinding. The venue 81 is preferably a casino resort, a mall or a grocery store. Alternatively, the venue 81 is an airport, a train station, an amusement park, or a business campus. The system 150 preferably includes a venue WLAN comprising multiple WAPs 75A and 75B, BLUETOOTH low energy beacons 70a-c, and a wayfinder server 95. The WLAN preferably comprises a venue server that preferably communicates with other services, such as Dynamic Host Configuration Protocol ("DHCP"), Remote Authentication Dial In User Service ("RADIUS"), authentication service, and marketing content service, and a patron server through the WLAN. The wayfinder server 95 is preferably off-site but may be on-site and connected to the WLAN. Communication with remote wayfinder server 95 is through the Internet 50 through the firewall if using the WLAN, or over a cellular network 55.

Figure 6:
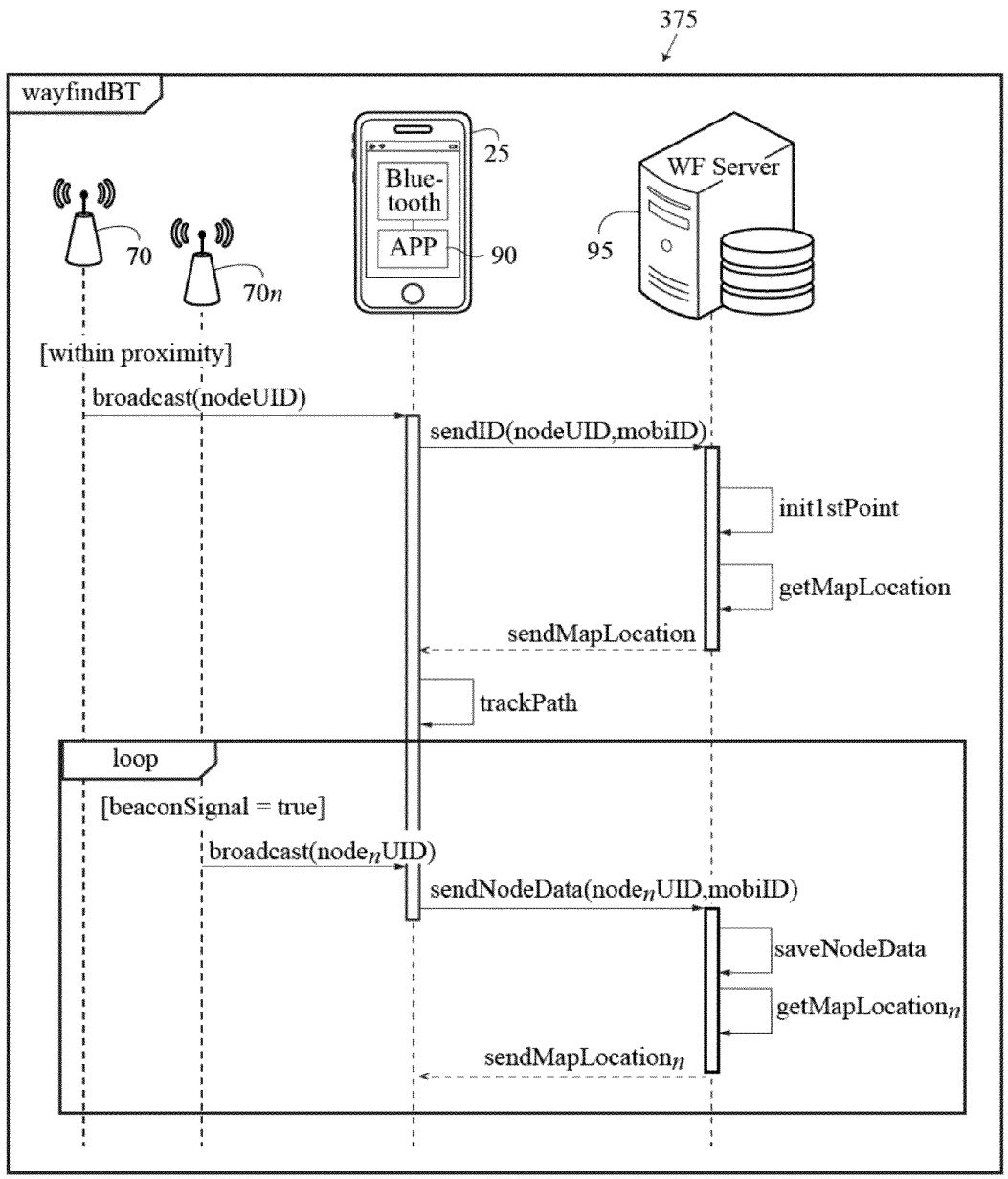
FIG. 6 is a communication sequence diagram of a system for wayfinding at a venue through guidance by a mobile communication device.

FIG. 6 is an illustration of a communications sequence between the BLUETOOTH low energy beacons 70, the resident native application 90, which resides in the memory of the mobile communication device 25, and the wayfinder server 95, located off-site or on-site. The resident native application 90 is configured to receive a beacon signal from the first BLUETOOTH low energy beacon 70a (usually at an entrance) and transmit a first message to the wayfinding server 95. The first message comprises an identifier for the first BLUETOOTH low energy beacon 70a and an identifier for the resident native application 90. The wayfinding server 95 is configured to receive the first message, determine a first fixed geographical location for the mobile communication device 25, and transmit the first fixed geographical location to the resident native application 90. The mobile communication device 25 is configured to track a path of the mobile communication device from the first fixed geographical location utilizing a plurality of sensors of the mobile communication device 25. The resident native application 90 is configured to receive a beacon signal from a second BLUETOOTH low energy beacon 70n of the plurality of BLUETOOTH low energy beacons, and transmit a second message to the wayfinding server 95. The second message comprises an identifier for the second BLUETOOTH low energy beacon 70n and the identifier for the resident native application 90. The wayfinding server 95 is configured to receive the second message, determine a second fixed geographical location for the mobile communication device 25, and transmit the second fixed geographical location to the resident native application 90. Preferably, a similar communication procedure is performed at each interaction of the resident native application 90 with a BLUETOOTH low energy beacon 70.

Figure 7:
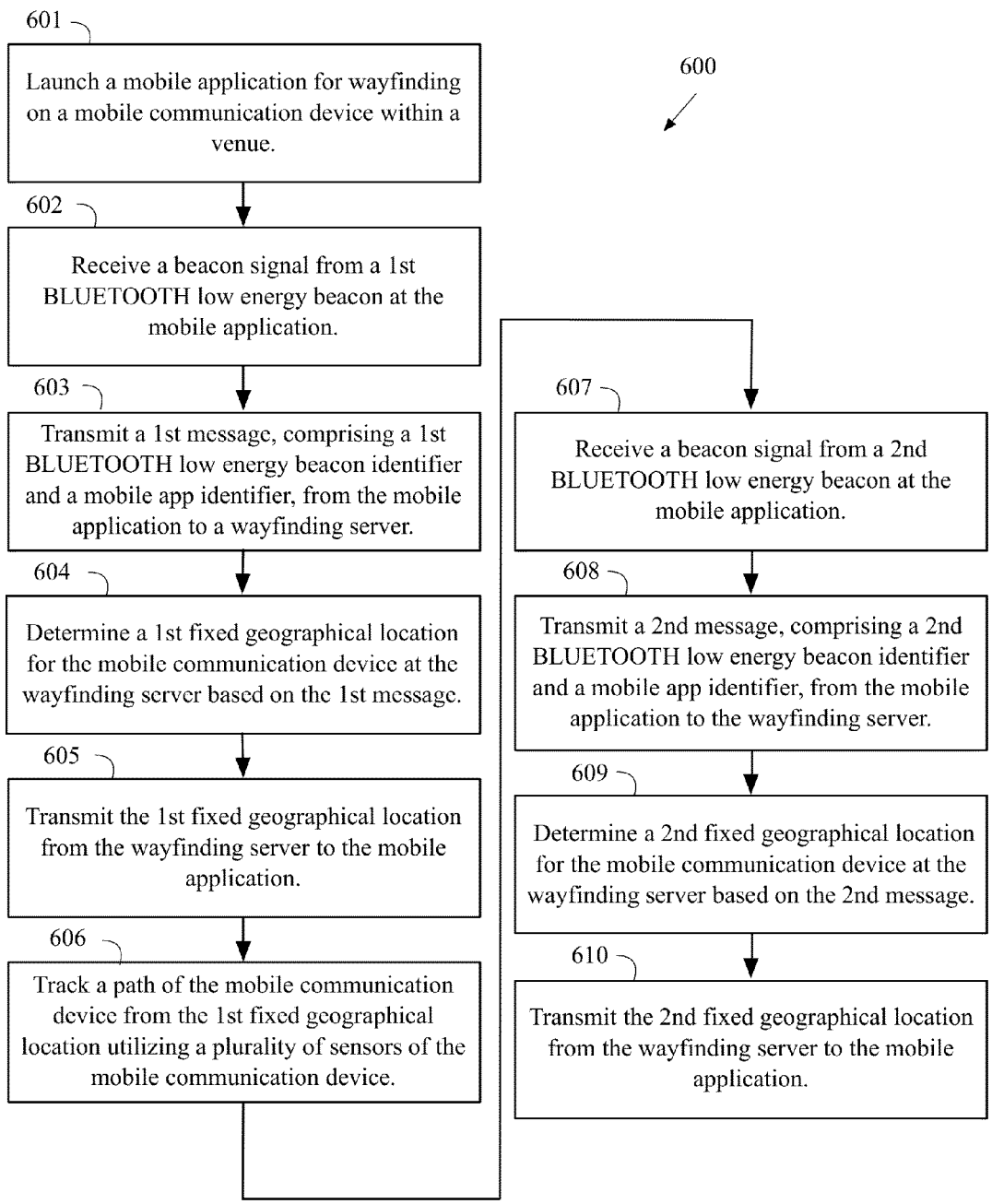
FIG. 7 is a flow chart of a method for wayfinding at a venue through guidance by a mobile communication device.

A flow chart for a method 600 for wayfinding at a venue is shown in FIG. 7. At block 601, a mobile application on a mobile communication device within a venue. The mobile application is for wayfinding at the venue. At block 602, a beacon signal is received from a first BLUETOOTH low energy beacon at the mobile application. At block 603, a first message is transmitted from the mobile application to a wayfinding server. The first message comprises an identifier for the first BLUETOOTH low energy beacon and an identifier for the mobile application. At block 604, a first fixed geographical location for the mobile communication device is determined at the wayfinding server based on the first message. At block 605, the first fixed geographical location is transmitted from the wayfinding server to the mobile application. At block 606, a path of the mobile communication device is tracked from the first fixed geographical location utilizing a plurality of sensors of the mobile communication device. At block 607, a beacon signal is received from a second BLUETOOTH low energy beacon at the mobile application. At block 608, a second message is transmitted from the mobile application to the wayfinding server. The second message comprises an identifier for the second BLUETOOTH low energy beacon and the identifier for the mobile application. At block 609, a second fixed geographical location for the mobile communication device is determined at the wayfinding server based on the second message. At block 610, the second fixed geographical location is transmitted from the wayfinding server to the mobile application.

BLUETOOTH™ technology operates in the unlicensed 2.4 GHz band of the radio-frequency spectrum, and in a preferred embodiment each beacon 45 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5MH (Band 11, 21, 24); 2300-2700 MHz (Band 7, 38, 40, 41); 3400-3800 MHz (Band 22, 42, 43), and in a preferred embodiment each beacon 45 is capable of receiving and transmitting signals using one or more of the LTE frequency bands. WiFi preferably operates using 802.11a, 802.11b, 802.11g, 802.11n communication formats as set forth by the IEEE.

The present invention may be utilized with a marketing system such as disclosed in Boyle et al., U.S. Pat. No. 8,433,342 for a Method And System For Personalized Venue Marketing, which is hereby incorporated by reference its entirety. The present invention may be utilized with a gaming system such as disclosed in Boyle, U.S. patent application Ser. No. 13/769,376, filed on Feb. 13, 2013, for a System And Method For Managing Games In A Mobile Virtual Casino, which is hereby incorporated by reference its entirety. The present invention may be utilized with a gaming system such as disclosed in Boyle, U.S. patent application Ser. No. 13/756,591, filed on Jan. 31, 2013, for a System And Method For Virtual Currency In A Virtual Casino, which is hereby incorporated by reference its entirety. The present invention may be utilized with a gaming system such as disclosed in Boyle, U.S. patent application Ser. No. 13/789,686, filed on Mar. 8, 2013, for a System And Method For Secure Play In A Mobile Virtual Casino, which is hereby incorporated by reference its entirety. The method and system of the present invention may be utilized with an anonymous loyalty program such as described in Boyle, U.S. Pat. No. 8,463,645 for an Anonymous Rewards Club Program, which is hereby incorporated by reference in its entirety. The method and system of the present invention may be utilized with the system described in Boyle et al., U.S. Pat. No. 8,315,209 for a VOIP Application For A Loyalty Program, which is hereby incorporated by reference in its entirety. The method and system of the present invention may be utilized with the system described in Boyle et al., U.S. Pat. No. 8,693,403 for a Method And System For Detection And Correction of WiFi Login Failure, which is hereby incorporated by reference in its entirety. The present invention may be utilized with a gaming system such as disclosed in Boyle, U.S. Pat. No. 8,573,499 for a Quick Response Code Business Card, which is hereby incorporated by reference in its entirety. The method and system of the present invention may be utilized with the system described in Greer et al., U.S. patent application Ser. No. 13/775,226, filed on Feb. 24, 2013, for an Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. patent application Ser. No. 13/974,040 filed on Aug. 22, 2013, for a Method And System For Including Content In A WiFi Stream, which is hereby incorporated by reference in its entirety. The method and system of the present invention may be utilized with the system described in Boyle et al., U.S. Pat. No. 8,725,170 for a System And Method For Measuring The Quantity, Type And Transmission Quality Of mobile Communication Devices Within A Defined Geographical Area, which is hereby incorporated by reference in its entirety. The method and system of the present invention may be utilized with the system described in Boyle et al., U.S. Pat. No. 8,583,777 for a Method And System For Providing Real-Time End-User WiFi Quality Data, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for wayfinding at a venue, the method comprising:

launching a mobile application on a mobile communication device within a venue, the mobile application for wayfinding at the venue;

receiving a beacon signal from a first BLUETOOTH low energy beacon at the mobile application;

transmitting a first message from the mobile application to a wayfinding server, the first message comprising an identifier for the first BLUETOOTH low energy beacon and an identifier for the mobile application;

determining a first fixed geographical location for the mobile communication device at the wayfinding server based on the first message;

transmitting the first fixed geographical location from the wayfinding server to the mobile application;

tracking a path of the mobile communication device from the first fixed geographical location utilizing a plurality of sensors of the mobile communication device, wherein the plurality of sensors of the mobile communication device comprises an accelerometer, a magnetometer and a gyroscope, wherein the accelerometer is configured to determine a movement of the mobile communication device and an orientation of the movement, wherein the magnetometer is configured to determine a true north heading of the mobile communication device, and wherein the gyroscope is configured to determine an orientation of the mobile communication device; and receiving a beacon signal from a second BLUETOOTH low energy beacon at the mobile application;

transmitting a second message from the mobile application to the wayfinding server, the second message comprising an identifier for the second BLUETOOTH low energy beacon and the identifier for the mobile application;

determining a second fixed geographical location for the mobile communication device at the wayfinding server based on the second message;

transmitting the second fixed geographical location from the wayfinding server to the mobile application;

utilizing the accelerometer of the mobile communication device to adjust a location of the mobile communication device from the first fixed geographical location;

requesting a supplemental first fixed geographical location for the mobile communication device; and calculating an error factor for the tracking the path of the mobile communication device from the first fixed geographical location for the mobile communication device to the supplemental first fixed geographical location for the mobile communication device, wherein the error factor is utilized for the tracking the path of the mobile communication device.

2. The method according to claim 1 further comprising transmitting venue content to the mobile communication device based on the path of the mobile communication from the first fixed geographical location to the second fixed geographical location.

3. The method according to claim 2 wherein the venue is a casino resort and the venue content is an offer from a bank of slot machines along the path of the mobile communication device, the venue is a retail shopping mall and the venue content is an offer from a retail store along the path of the mobile communication device, or the venue is a retail mall and the venue content is an electronic gift card for purchases at the retail mall.

4. The method according to claim 1 wherein the mobile application transmits the first message and the second message to the wayfinding server over a cellular network.

5. The method according to claim 1 wherein the mobile application transmits the first message and the second message to the wayfinding server over a venue network comprising a plurality of wireless access points within the venue.

6. The method according to claim 1 further comprising guiding an end-user through the venue from the first fixed geographical location to the second fixed geographical location.

7. The method according to claim 1 further comprising transmitting a request from the mobile application to a venue server to transmit a venue content based on based on the path of the mobile communication from the first fixed geographical location to the second fixed geographical location.

8. A system for wayfinding at a venue, the system comprising:

a mobile communication device comprising a mobile native application for wayfinding at the venue and a plurality of sensors, wherein the mobile native application resides within a memory of the mobile communication device, wherein the plurality of sensors of the mobile communication device comprises an accelerometer, a magnetometer and a gyroscope, wherein the accelerometer is configured to determine a movement of the mobile communication device and an orientation of the movement, wherein the magnetometer is configured to determine a true north heading of the mobile communication device, and wherein the gyroscope is configured to determine an orientation of the mobile communication device; and a venue comprising a plurality of BLUETOOTH low energy beacons positioned within the venue with a first BLUETOOTH low energy beacon positioned at an entrance to the venue;

a wayfinding server;

wherein the mobile native application is configured to receiving a beacon signal from the first BLUETOOTH low energy beacon and transmit a first message to the wayfinding server, the first message comprising an identifier for the first BLUETOOTH low energy beacon and an identifier for the mobile application;

wherein the wayfinding server is configured to receive the first message, determine a first fixed geographical location for the mobile device, and transmit the first fixed geographical location to the mobile native application;

wherein the mobile native application is configured to track a path of the mobile communication device from the first fixed geographical location utilizing the plurality of sensors of the mobile communication device;

wherein the mobile native application is configured to receive a beacon signal from a second BLUETOOTH low energy beacon of the plurality of BLUETOOTH low energy beacons, and transmit a second message to the wayfinding server, the second message comprising an identifier for the second BLUETOOTH low energy beacon and the identifier for the mobile application;

wherein the wayfinding server is configured to receive the second message, determine a second fixed geographical location for the mobile device, and transmit the second fixed geographical location to the mobile native application;

wherein the mobile native application is configured to request a supplemental first fixed geographical location for the mobile communication device within a meter of the first fixed geographical location for the mobile communication device, and the mobile communication device is configured to calculate an error factor for the tracking the path of the mobile communication device from the first fixed geographical location for the mobile communication device to the supplemental first fixed geographical location for the mobile communication device, wherein the error factor is utilized for the tracking the path of the mobile communication device.

9. The system according to claim 8 further comprising a venue network comprising a plurality of wireless access points and a venue server comprising a HTTP proxy, wherein the mobile native application is configured to communicate with the wayfinding server over the venue network.

10. The system according to claim 8 wherein the mobile native application transmits the first message and the second message to the wayfinding server over a cellular network.

11. The system according to claim 8 wherein the mobile native application is configured to transmit to a venue server to transmit a venue content based on based on the path of the mobile communication from the first fixed geographical location to the second fixed geographical location.

12. A system for wayfinding at a venue utilizing a mobile communication device, the system comprising:
a mobile communication device comprising a mobile application for wayfinding at the venue, a plurality of sensors and a battery, wherein the plurality of sensors of the mobile communication device comprises an accelerometer, a magnetometer and a gyroscope, wherein the accelerometer is configured to determine a movement of the mobile communication device and an orientation of the movement, wherein the magnetometer is configured to determine a true north heading of the mobile communication device, and wherein the gyroscope is configured to determine an orientation of the mobile communication device;
and a venue comprising a plurality of BLUETOOTH low energy beacons positioned within the venue;
a wayfinding server;
wherein the mobile application is configured to receiving beacon signals from the plurality of BLUETOOTH low energy beacons and transmit a message to the wayfinding server for each of the beacon signals, the message comprising an identifier for a BLUETOOTH low energy beacon and an identifier for the mobile application;
wherein the wayfinding server is configured to receive the message, determine a first fixed geographical location for the mobile device, and transmit the first fixed geographical location to the mobile application;
wherein the mobile application is configured to track a path of the mobile communication device from the first fixed geographical location utilizing the plurality of sensors of the mobile communication device;
wherein the mobile application is configured to request a supplemental first fixed geographical location for the mobile communication device within a meter of the first fixed geographical location for the mobile communication device, and the mobile application is configured to calculate an error factor for guidance of the mobile communication device from the first fixed geographical location for the mobile communication device to the supplemental first fixed geographical location for the mobile communication device, wherein the error factor is utilized for the guidance of the mobile communication device to a second fixed geographical location within the venue.

13. The system according to claim 12 wherein the guidance is a plurality of tactile signals.

14. The system according to claim 12 wherein the mobile communication device is configured to receive a term associated with a second fixed geographical location to activate guidance from a first fixed geographical location to the second fixed geographical location in the venue.

15. The system according to claim 14 wherein: the venue is a retail mall and term is a name of a store; the venue is a casino resort and the term is a card game; the venue is a hospital and the term is a medical department; the venue is an airport and the term is a gate number; the venue is an amusement park and the term is a ride; the venue is a convention center and the term is a conference room; the venue is a hotel and the term is a recreational facility; the venue is a municipality and the term is a government office; and the venue is a school and the term is a library.

* * * * *